United States Patent [19]

Saito et al.

[11] Patent Number: 4,626,564

[45] Date of Patent: Dec. 2, 1986

[54] AROMATIC POLYSULFONE RESIN COMPOSITION

[75] Inventors: Teruo Saito, Shiga; Kazuo Hieda, Hyogo, both of Japan

[73] Assignee: Sumitomo Chemical Company, Ltd., Osaka, Japan

[21] Appl. No.: 806,865

[22] Filed: Dec. 9, 1985

[30] Foreign Application Priority Data

Dec. 11, 1984 [JP] Japan .................................. 59-261199
Mar. 4, 1985 [JP] Japan .................................. 60-42465

[51] Int. Cl.$^4$ ................................................ C08K 7/04
[52] U.S. Cl. ..................................... 524/413; 524/609
[58] Field of Search ........................................ 524/413

[56] References Cited

FOREIGN PATENT DOCUMENTS 59-182853 10/1984 Japan .
59-182854 10/1984 Japan .

OTHER PUBLICATIONS

"New Inorganic Fibers for Plastic Reinforcement", Linsen and Regester, 27th Annual Technical Conference, 1972, Reinforced Plastics/Composites Institute, The Society of the Plastics Industry, Inc., Section 11-D, pp. 1-10.

Primary Examiner—Lewis T. Jacobs
Attorney, Agent, or Firm—Sughrue, Mion, Zinn, Macpeak and Seas

[57] ABSTRACT

An aromatic polysulfone resin composition comprising from 30% to 95% by weight of an aromatic polysulfone and from 5% to 70% by weight of a potassium titanate fiber having not more than 0.25% by weight of a free potassium content is disclosed. The composition has improved heat resistance, strength, rigidity and, in particular, does not undergo gelation during melting.

5 Claims, No Drawings

AROMATIC POLYSULFONE RESIN COMPOSITION

FIELD OF THE INVENTION

This invention relates to an aromatic polysulfone resin composition and, more particularly, to an aromatic polysulfone resin composition having excellent mechanical properties, thermal properties and dimensional stability and, in particular, improved heat stability during melting.

BACKGROUND OF THE INVENTION

Aromatic polysulfone resins have been noted as engineering plastic for electric parts or automobile parts because of their excellent heat resistance, strength, rigidity, flame retardancy, chemical resistance, etc.

With the recent technical development in these fields of application, it has been demanded to develop a resin material having further improved heat resistance, strength and rigidity while retaining the properties characteristic of the aromatic polysulfone resins, such as flame retardancy, chemical resistance, hot water resistance, molding processability, and the like.

A resin composition comprising an aromatic polysulfone and a potassium titanate fiber has been proposed ad hoc. In this composition, however, as the proportion of a potassium titanate fiber increases to ensure a high reinforcing effect, it undergoes gelation to lose fluidity, making molding impossible while being retained at high temperatures in melt processing, e.g., injection molding.

SUMMARY OF THE INVENTION

Accordingly, an object of this invention is to provide a resin composition comprising an aromatic polysulfone and a potassium titanate fiber having excellent mechanical properties, thermal properties and dimensional stability.

In particular, an object of this invention is to provide a resin composition comprising an aromatic polysulfone and a potassium titanate fiber having an improved heat stability in a molten state.

As a result of extensive studies, it has now been found that the above objects can be achieved by a resin composition comprising from 30% to 95% by weight of an aromatic polysulfone and from 5% to 70% by weight of a potassium titanate fiber having not more than 0.25% by weight of a free potassium content.

DETAILED DESCRIPTION OF THE INVENTION

The aromatic polysulfone which can be used in the composition of this invention can be identified as a polyarylene compound, in which arylene units are bonded together via an ether linkage, a sulfone group or an isopropylidene group regularly or irregularly. Examples of such polyarylene compounds are shown below. Of these, those having structures (1), (2) and (6) are preferred owing to their well-balanced physical properties and processability.

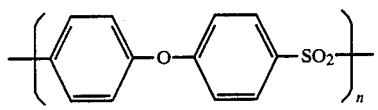

(1)

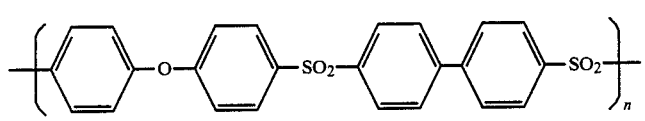

(2)

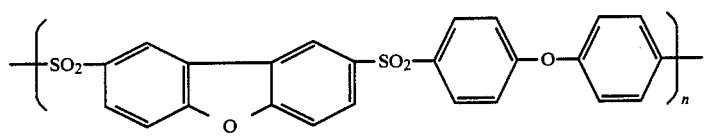

(3)

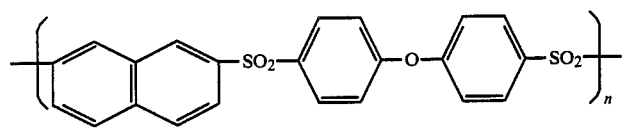

(4)

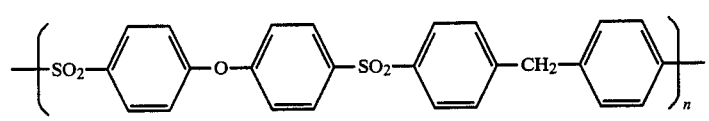

(5)

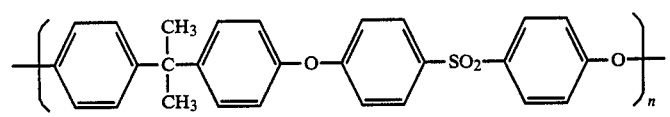

(6)

-continued

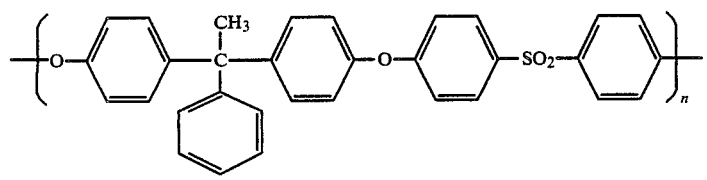
(7)

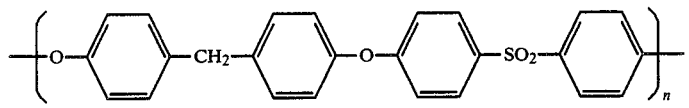
(8)

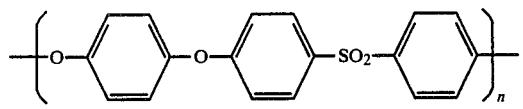
(9)

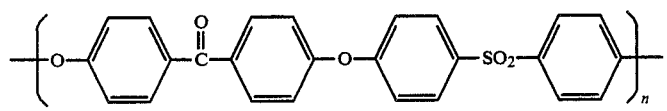
(10)

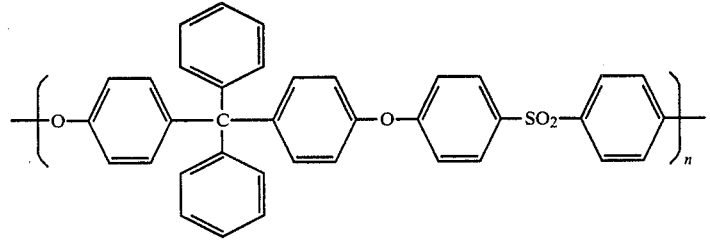
(11)

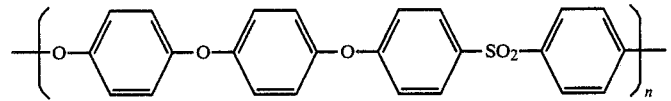
(12)

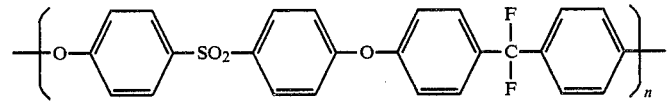
(13)

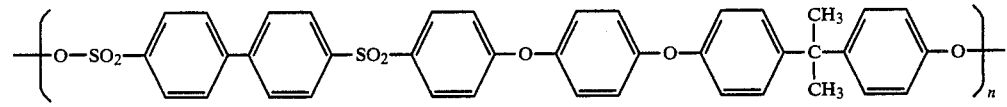
(14)

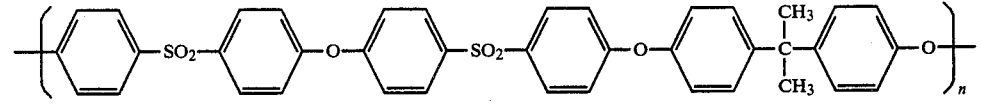
(15)

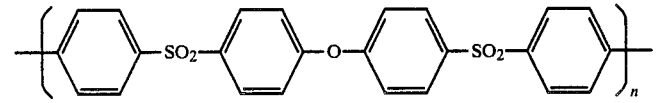
(16)

Further, those having a reduced viscosity of from 0.3 to 0.6 (in 100 cc dimethylformamide solution containing 1 g of a sample; at 25° C.) are more preferred in view of a balance between physical properties, such as heat resistance, strength, rigidity and toughness, and molding processability.

The aromatic polysulfone is used in an amount of from 30% to 95% by weight based on the total amount of the aromatic polysulfone and the potassium titanate fiber, and the potassium titanate fiber is used in an amount of from 5% to 70% by weight on the same basis. If the amount of the aromatic polysulfone exceeds 95% by weight and the amount of the potassium titanate fiber is less than 5% by weight, sufficient improvement in heat resistance, rigidity and dimensional stability cannot be obtained. On the other hand, if the amount of the aromatic polysulfone is less than 30% by weight, and the amount of the potassium titanate fiber exceeds 70% by weight, dispersion in a melt mixer is insufficient and also the melt viscosity of the composition markedly increases to reduce fluidity, thus making it difficult to effect molding under normal conditions.

The potassium titanate fiber which can be used in the present invention is one of the so-called whiskers, i.e., high-strength needle single crystal fibers, and has a basic chemical composition of $K_2O \cdot 6TiO_2$ or $K_2O \cdot 6TiO_2 \cdot 1/2H_2O$. It has a typical melting point of from 1,300° C. to 1,350° C., an average fiber length of from 5 μm to 150 μm, and preferably from 10 μm to 30 μm, and an average fiber diameter of from 0.05 μm to 2.0 μm, and preferably from 0.1 μm to 0.5 μm.

In the present invention, the potassium titanate fiber should have a free potassium content of not greater than 0.25% by weight. If the free potassium content exceeds 0.25% by weight, the resulting aromatic polysulfone resin composition has a reduced heat stability during melting and undergoes extreme rise in viscosity through retention in a molten state. In particular, such a rise in viscosity becomes conspicuous at higher temperatures for longer retention times and with higher proportions of the potassium titanate fiber, leading to gelation to lose fluidity, thus making molding impossible. The most remarkable effect of limiting the free potassium content of the potassium titanate fiber can be exerted when the potassium titanate fiber content in the resin composition is 20% by weight or more.

The free potassium content in the potassium titanate fiber being not greater than 0.25% by weight, an increase in melt viscosity can be minimized to a very slight degree. Prevention of increase of melt viscosity can further be ensured even under severe conditions by controlling the free potassium content to not greater than 0.20% by weight, and in particular, to not greater than 0.05% by weight.

The free potassium content of the potassium titanate fiber can be determined by boiling a given amount of the fiber in water for a long time and determining the thus extracted potassium by flame spectrophotometry, atomic-absorption spectrophotometry, ICP (high frequency-induced combined plasma) emission spectroanalysis, and the like.

The process for producing potassium titanate fibers to be used in the present invention is not particularly restricted. For example, known processes for synthesizing potassium titanate include calcination, melting, hydration and fluxing. The chemical composition ($K_2O \cdot n \cdot TiO_2$) of potassium titanate and the fiber length vary depending on the mixing ratio of $K_2O$ and $TiO_2$, reaction temperature, basicity of reaction system, and the like. The free potassium content of the resulting fiber can be adjusted so as to fall within the above-recited range by reducing a free $K_2O$ content by selecting proper reaction conditions. Further, potassium titanate fiber having a free potassium content within the above-recited range can also be obtained by subjecting a potassium titanate fiber containing from 0.27% to 0.40% by weight of free potassium that is obtainable by a general industrial process to calcination at a high temperature, e.g., 500° C. or higher, or by removing free $K_2O$ from the above-described potassium titanate fiber by extracting with water or an acid.

Mode of blending the aromatic polysulfone and the potassium titanate fiber to prepare the composition of this invention is not particularly limited. For example, the aromatic polysulfone and the potassium titanate fiber may be fed to a melt mixer separately, or these raw materials may be preliminarily mixed by means of a mortar, a Henschel mixer, a ball mill, a ribbon blender, etc. and then fed to a melt mixer.

The composition according to the present invention may further contain one or more of additives, such as antioxidants, heat stabilizers, ultraviolet light absorbents, lubricants, parting agents, colorants e.g., dyes or pigments, flame retarding aids, antistatic agents, and the like, as far as they do not impair the effects of the present invention.

In the present invention, the potassium titanate fiber, when blended with the aromatic polysulfone, is effective to improve various properties, such as resistance to heat distortion, strength, rigidity, dimensional accuracy, etc. Further, an unfavorable increase in viscosity due to gelation can effectively be prevented by controlling the free potassium content in such a potassium titanate fiber within 0.25% by weight. This is believed to be ascribable to prevention of free potassium from reacting with an active group of the aromatic polysulfone, e.g., a terminal hydroxyl group, in a molten state to cause increase in viscosity.

The present invention will now be illustrated in greater detail with reference to the following examples and comparative examples, but it should be understood that the present invention is not limited thereto.

In these examples, a free potassium content in potassium titanate fibers was determined by boiling a prescribed amount of the potassium titanate fiber in water for 20 hours and analyzing the water containing eluted potassium by the use of an apparatus for both flame spectrophotometry and atomic-absorption spectrophotometry (Model 650 manufactured by Shimazu Seisakusho Ltd.; double-beam spectrophotometer; wavelength of measurement: 7,665 Å).

EXAMPLES 1 TO 3

A polyether sulfone having a repeating unit of the formula:

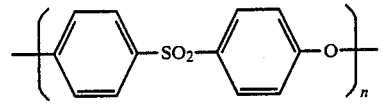

("3600P", a trade name produced by Imperial Chemical Industries Co., Ltd.; reduced viscosity 0.36) and a potassium titanate fiber containing 0.03% by weight of free potassium ("HT-200", a trade name produced by Titan Kogyo K.K.; fiber diameter: 0.3 μm to 1.0 μm; fiber length: 20 μm to 120 μm) were mixed at a ratio shown in Table 1, and the mixuture was melt-kneaded in a biaxial extruder ("PCM-30", a trade name manufactured by Ikegai Iron Works Co., Ltd.) at 340° C. The resulting strand was cooled with cold water and cut into pellets.

The resulting pellets were molded using an injection molding machine, (Sumitomo Nestal 47/28 at a cylinder temperature of 360° C. to 380° C. and a mold temperature of 130° C. to prepare a bending test piece, an Izod impact test piece and a test piece for determining heat distortion temperature.

Flexural modulus of elasticity, Izod impact strength and heat distortion temperature were determined using these test pieces in accordance with ASTM D-790, D-256 and D-648, respectively.

Heat stability of the resin composition in a molten state was evaluated by determining a melt viscosity by means of a Koka-type flow tester (produced by Shimazu Seisakusho Ltd.) under conditions of a temperature of 400° C., a load of 50 kg/cm², a nozzle diameter of 1 mm, a land length of 10 mm and a retention time of 5 minutes or 30 minutes.

The results obtained are shown in Table 1. These results demonstrate that the resin compositions according to the present invention have high flexural modulus of elasticity, impact strength, heat distortion properties and heat stability in the molten state.

When the resin composition was retained in the injection molding machine at 380° C. for 30 minutes, no appreciable change in injection moldability was noted in any sample.

COMPARATIVE EXAMPLES 1 TO 3

The same procedures as described in Examples 1 to 3 were repeated except for using a potassium titanate fiber containing 0.28% by weight of free potassium. The results obtained are shown in Table 1.

It can be seen from Table 1 that each of the resin compositions can be molded using an injection molding machine without suffering any inconvenience to provide molded articles having equal properties to those in Examples 1 to 3 as far as the retention time is short. However, the comparative data of melt viscosity indicate poor heat stability of the molten resin compositions.

In the injection molding, when the resin composition was retained at 380° C. for 30 minutes, gelation of the molten resin occurred to make molding impossible.

EXAMPLES 4 TO 6

The same procedures as described in Examples 1 to 3 were repeated except for using a potassium titanate fiber having a free potassium content of 0.16% by weight (a TISMO heat-treated product produced by Otsuka Chemical Co., Ltd.; fiber diameter: 0.3 $\mu$m to 1.0 $\mu$m; fiber length: 20 $\mu$m to 120 $\mu$m). The test results obtained are shown in Table 1 below.

TABLE 1

| Example No. | Resin Composition Polyether Sulfone (wt %) | Resin Composition Potassium Titanate Fiber (wt %) | Free Potassium Content in Potassium Titanate Fiber (wt %) | Mechanical Property Flexural Modulus of Elasticity (kg/cm²) | Mechanical Property Unnotched Izod Impact Strength (kg·cm/cm) | Thermal Property Heat Distortion Temperature (18.6 kg/cm²) (°C.) | Melt Viscosity 5 Mins. Retention (poise) | Melt Viscosity 30 Mins. Retention (poise) |
|---|---|---|---|---|---|---|---|---|
| Example 1 | 40 | 60 | 0.03 | 130,000 | 10 | 218 | 2050 | 2100 |
| Example 2 | 70 | 30 | 0.03 | 73,000 | 50 | 210 | 930 | 1050 |
| Example 3 | 90 | 10 | 0.03 | 50,000 | 85 | 208 | 650 | 630 |
| Comparative Example 1 | 40 | 60 | 0.28 | 128,000 | 9 | 217 | 4600 | non-extrudable |
| Comparative Example 2 | 70 | 30 | 0.28 | 75,000 | 45 | 211 | 1030 | non-extrudable |
| Comparative Example 3 | 90 | 10 | 0.28 | 52,000 | 80 | 207 | 710 | non-extrudable |
| Example 4 | 40 | 60 | 0.16 | 129,000 | 9 | 218 | 2100 | 2500 |
| Example 5 | 70 | 30 | 0.16 | 75,000 | 48 | 210 | 1010 | 1150 |
| Example 6 | 90 | 10 | 0.16 | 51,000 | 85 | 207 | 700 | 720 |

While the invention has been described in detail and with reference to specific embodiments thereof, it will be apparent to one skilled in the art that various changes and modifications can be made therein without departing from the spirit and scope thereof.

What is claimed is:

1. An aromatic polysulfone resin composition comprising from 30% to 95% by weight of an aromatic polysulfone and from 5% to 70% by weight of a potassium titanate fiber having not more than 0.25% by weight of a free potassium content.

2. An aromatic polysulfone resin composition as in claim 1, wherein the potassium titanate fiber is present in an amount of not less than 20% by weight.

3. An aromatic polysulfone resin composition as in claim 1, wherein the potassium titanate fiber has not more than 0.20% by weight of a free potassium content.

4. An aromatic polysulfone resin composition as in claim 1, wherein the potassium titanate fiber has not more than 0.05% by weight of a free potassium content.

5. An aromatic polysulfone resin composition as in claim 1, wherein the potassium titanate fiber has an average fiber length of from 10 $\mu$m to 30 $\mu$m and an average fiber diameter of from 0.1 $\mu$m to 0.5 $\mu$m.

* * * * *